United States Patent
Shimamoto et al.

(10) Patent No.: US 9,797,608 B2
(45) Date of Patent: Oct. 24, 2017

(54) AIR-CONDITIONING APPARATUS

(71) Applicants: Daisuke Shimamoto, Tokyo (JP); Yuji Motomura, Tokyo (JP); Osamu Morimoto, Tokyo (JP); Takayoshi Honda, Tokyo (JP); Tatsuo Ono, Tokyo (JP); Koji Nishioka, Tokyo (JP)

(72) Inventors: Daisuke Shimamoto, Tokyo (JP); Yuji Motomura, Tokyo (JP); Osamu Morimoto, Tokyo (JP); Takayoshi Honda, Tokyo (JP); Tatsuo Ono, Tokyo (JP); Koji Nishioka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 172 days.

(21) Appl. No.: 14/441,334

(22) PCT Filed: Nov. 30, 2012

(86) PCT No.: PCT/JP2012/081074
§ 371 (c)(1),
(2) Date: May 7, 2015

(87) PCT Pub. No.: WO2014/083683
PCT Pub. Date: Jun. 5, 2014

(65) Prior Publication Data
US 2015/0276240 A1   Oct. 1, 2015

(51) Int. Cl.
*F25B 13/00* (2006.01)
*F24F 3/06* (2006.01)
(Continued)

(52) U.S. Cl.
CPC ............ *F24F 3/065* (2013.01); *F24F 5/0003* (2013.01); *F24F 11/001* (2013.01);
(Continued)

(58) Field of Classification Search
CPC ........ F24F 3/065; F24F 11/008; F24F 11/001; F24F 11/0079; F24F 5/0003;
(Continued)

(56) References Cited

U.S. PATENT DOCUMENTS 5,353,604 A * 10/1994 Oguni ..................... F25B 49/02
  62/207
5,499,508 A *  3/1996 Arai ........................ F25B 13/00
  62/114
2013/0219937 A1    8/2013 Motomura et al.

FOREIGN PATENT DOCUMENTS

CN      202419802 U     9/2012
JP    2000-227242 A     8/2000
(Continued)

OTHER PUBLICATIONS

Extended European Search Report dated Jun. 23, 2016 issued in corresponding EP patent application No. 12889243.7.
(Continued)

*Primary Examiner* — Len Tran
*Assistant Examiner* — Ana Vazquez
(74) *Attorney, Agent, or Firm* — Posz Law Group, PLC

(57) ABSTRACT

In an air-conditioning apparatus including a plurality of indoor units connected to a heat medium converter and a plurality of remote controllers respectively provided for the indoor units, the remote controllers each include a temperature sensor that detect a temperature of a corresponding space to be air-conditioned, and are each configured to communicate with a heat medium converter controller of the heat medium converter and an indoor unit controller of the corresponding indoor unit, transmit an instruction to start and stop an operation and data related to rotation speed of an indoor air-sending device to the corresponding indoor unit controller, and transmit the instruction to start and stop the operation, and a target temperature and a temperature
(Continued)

detected by the temperature sensor or a difference therebetween, to the heat medium converter controller.

4 Claims, 7 Drawing Sheets

(51) Int. Cl.
*F24F 5/00* (2006.01)
*F24F 11/00* (2006.01)
*F25B 25/00* (2006.01)
*F25B 49/02* (2006.01)

(52) U.S. Cl.
CPC ........ *F24F 11/008* (2013.01); *F24F 11/0012* (2013.01); *F24F 11/0079* (2013.01); *F25B 13/00* (2013.01); *F25B 25/005* (2013.01); *F25B 49/02* (2013.01); *F24F 2011/0043* (2013.01); *F24F 2011/0045* (2013.01); *F24F 2011/0057* (2013.01); *F25B 2313/007* (2013.01); *F25B 2313/0231* (2013.01); *F25B 2313/0272* (2013.01); *F25B 2313/02743* (2013.01); *F25B 2313/0314* (2013.01); *F25B 2700/1931* (2013.01); *F25B 2700/1933* (2013.01); *Y02B 30/746* (2013.01)

(58) Field of Classification Search
CPC ........... F24F 11/0012; F24F 2011/0043; F24F 2011/0045; F25B 49/02; F25B 2313/0231; F25B 2313/007; F25B 2313/02743; F25B 2313/0272; F25B 2313/0314; F25B 25/005; F25B 2700/1931; Y02B 30/746
See application file for complete search history.

(56) References Cited

FOREIGN PATENT DOCUMENTS

| | | | | |
|---|---|---|---|---|
| JP | 2000-283488 A | 10/2000 | | |
| JP | 2008-39388 A | 2/2008 | | |
| JP | WO 2011048679 A1 * | 4/2011 | ................ | F24F 3/06 |
| JP | 2012-184868 A | 9/2012 | | |
| WO | 2010/109571 A1 | 9/2010 | | |
| WO | 2010/109617 A1 | 9/2010 | | |
| WO | 2012077166 A1 | 6/2012 | | |

OTHER PUBLICATIONS

International Search Report of the International Searching Authority dated Mar. 5, 2013 for the corresponding international application No. PCT/JP2012/081074 (and English translation).
Office Action dated Nov. 17, 2015 in the corresponding JP application No. 2014-549730 (with English translation).
Chinese Office Action dated Nov. 23, 2016 in the corresponding CN application No. 201280077269.9 (English translation attached).
Office Action dated Jul. 11, 2017 issued in corresponding CN patent application No. 201280077269.9 (and English translation).

* cited by examiner

F I G. 5
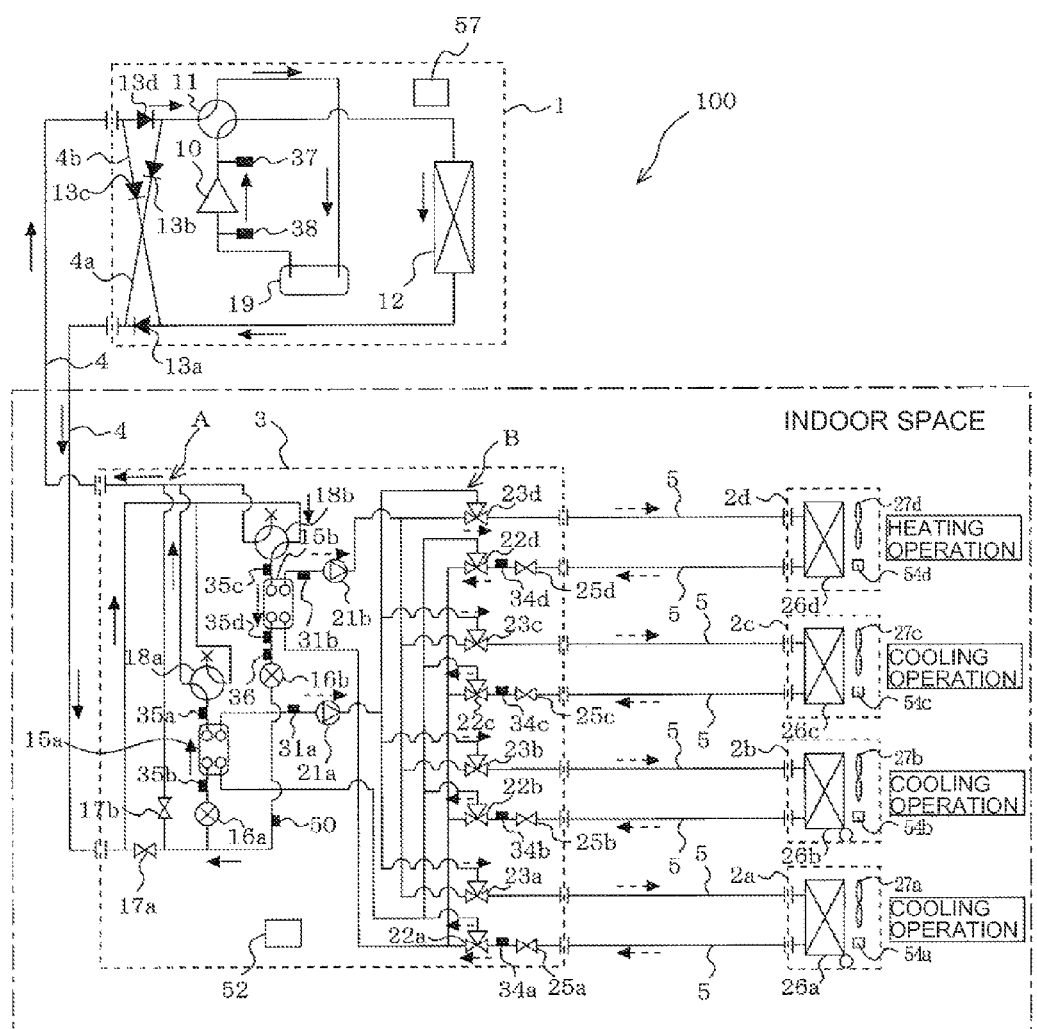

FIG. 7

| INFORMATION ITEM | OUTDOOR UNIT 1 | | HEAT MEDIUM CONVERTER 3 | | | | INDOOR UNIT 2 | | REMOTE CONTROLLER 53 | |
|---|---|---|---|---|---|---|---|---|---|---|
| | | | CIRCUIT A SIDE | | CIRCUIT B SIDE | | | | | |
| | CIRCUIT DIAGRAM | COMMUNI-CATION COUNTER-PART | CIRCUIT DIAGRAM | COMMUNI-CATION COUNTER-PART | CIRCUIT DIAGRAM | COMMUNI-CATION COUNTER-PART | CIRCUIT DIAGRAM | COMMUNI-CATION COUNTER-PART | CIRCUIT DIAGRAM | COMMUNI-CATION COUNTER-PART |
| COMPRESSOR CAPACITY | 10 | NIL | NIL | — | NIL | — | NIL | — | NIL | — |
| PUMP CAPACITY | NIL | — | NIL | — | 21a,21b | NIL | NIL | — | NIL | — |
| FAN CONTROL | OMITTED | NIL | NIL | — | NIL | — | OMITTED | NIL | OMITTED | 2 |
| EXPANSION DEVICE | NIL | NIL | 16a,16b | NIL | 25a~25d | NIL | NIL | — | NIL | — |
| PRESSURE SENSOR | 37 | NIL | 36 | — | NIL | — | NIL | — | NIL | — |
| | 38 | NIL | NIL | — | NIL | — | NIL | — | NIL | — |
| TEMPERATURE SENSOR | NIL | — | 35a~35d | NIL | 31a,31b | NIL | NIL | — | 39a~39d | 3 |
| | NIL | — | NIL | — | 34a~34d | NIL | NIL | — | NIL | — |
| SWITCHING VALVE | 11 | NIL | 18a,18b | NIL | 22a~22d | NIL | NIL | — | NIL | — |
| | NIL | — | NIL | — | 23a~23d | NIL | NIL | — | NIL | — |
| TARGET TEMPERATURE | NIL | — | NIL | — | NIL | — | NIL | — | 40a~40d | 3 |
| INDOOR UNIT OPERATION | NIL | — | NIL | — | NIL | — | NIL | — | OMITTED | 1 |
| | | | | | | | | | | 2 |
| | | | | | | | | | | 3 |

AIR-CONDITIONING APPARATUS

CROSS REFERENCE TO RELATED APPLICATION

This application is a U.S. national stage application of International Application No. PCT/JP2012/081074 filed on Nov. 30, 2012, the disclosure of which is incorporated by reference.

TECHNICAL FIELD

The present invention relates to an air-conditioning apparatus to be used as, for example, a multi-air-conditioning apparatus for building.

BACKGROUND ART

Some of existing air-conditioning apparatuses include, as in the case of a multi-air-conditioning apparatus for building, a heat source unit located outside a building and indoor units located inside the building (see Patent Literature 1). Refrigerant circulating in a refrigerant circuit of such an air-conditioning apparatus transmits or receives heat to or from air supplied to a heat exchanger of the indoor unit, thereby heating or cooling the air. Then the heated or cooled air is blown into a space to be air-conditioned, to heat or cool the space.

Normally the building includes a plurality of indoor spaces, and hence such an air-conditioning apparatus accordingly includes a plurality of indoor units. In addition, when the building is large the refrigerant pipe connecting between the outdoor unit and the indoor units may even reach 100 meters. When the pipe connecting between the outdoor unit and the indoor units is longer, the amount of the refrigerant to be loaded in the refrigerant circuit increases as much.

The indoor units of the multi-air-conditioning apparatus for building are normally installed and utilized in indoor spaces where people are present (e.g., offices, living rooms, and stores). In case that for some reason the refrigerant leaks out of the indoor unit installed in the indoor space, serious concerns may arise from the viewpoint of impact to human body and safety, because some kind of refrigerants are flammable and/or poisonous. Even when the refrigerant is harmless to human body, the leakage of the refrigerant leads to a decrease in oxygen concentration in the indoor space, which may exert a negative influence to human body.

Accordingly, an air-conditioning apparatus including dual loops has been proposed, in which refrigerant is used in a primary loop and water or brine, which is harmless, is used in a secondary loop, to condition the air in a space where persons are present (see, for example, Patent Literature 2).

CITATION LIST

Patent Literature

Patent Literature 1: Japanese Unexamined Patent Application Publication No. 2000-227242
Patent Literature 2: International Publication No. 2010/109571

SUMMARY OF INVENTION

Technical Problem

The conventional air-conditioning apparatuses that include a plurality of indoor units are provided with a plurality of remote controllers corresponding to the respective indoor units. The remote controllers are each configured to transmit instructions to start or stop the operation, with a desired operation mode and a target temperature (desired temperature of the space to be air-conditioned), to the corresponding indoor unit. In addition, the indoor units each include a sucked air temperature sensor that detects the temperature of the air-conditioned space. Accordingly, in the conventional air-conditioning apparatus including a plurality of indoor units, first the remote controller transmits the instruction of the operation and data related to the target temperature and rotation speed of an indoor air-sending device to the controller of the indoor unit, to activate the air-conditioning apparatus. Upon receipt of such instruction and data, the controller of the indoor unit transmit the received instruction and data to a controller of a heat source unit, together with data detected by the sucked air temperature sensor. In other words, the conventional air-conditioning apparatus including a plurality of indoor units is configured to again transmit the instruction and data transmitted from the remote controller to the controller of the indoor unit, to the controller of the heat source unit. The conventional air-conditioning apparatus including a plurality of indoor units has, therefore, the drawback in that the communication traffic increases along with an increase in number of indoor units.

The present invention has been accomplished in view of the foregoing problem, and provides an air-conditioning apparatus configured to suppress an increase in communication traffic despite the number of indoor units being increased.

Solution to Problem

In an aspect, the present invention provides an air-conditioning apparatus including a heat source unit that exchanges heat between outdoor air and a heat source-side heat exchanger thereby generating cooling energy or heating energy, a plurality of indoor units each connected to the heat source unit, and configured to exchange heat between air in a space to be air-conditioned supplied by an indoor air-sending device and a use-side heat exchanger and transmit the cooling energy or heating energy supplied from the heat source unit to the space to be air-conditioned thereby conditioning air in the space to be air-conditioned, a plurality of remote controllers respectively provided for the plurality of indoor units to input an instruction to start and stop an operation of the corresponding indoor unit, an operation mode, and a target temperature of the space to be air-conditioned by the corresponding the indoor unit, a heat source unit controller provided in the heat source unit and configured to control devices constituting the heat source unit, and a plurality of indoor unit controllers respectively provided in the indoor units and configured to control devices constituting the indoor unit. The remote controllers each include a temperature sensor that detect a temperature of the corresponding space to be air-conditioned, and is configured to communicate with the heat source unit controller and the indoor unit controller of the corresponding indoor unit, transmit the instruction to start and stop the operation and data related to rotation speed of the indoor air-sending device to the corresponding indoor unit controller, and transmit the instruction to start and stop the operation, and the target temperature and the temperature detected by the temperature sensor or a difference therebetween, to the heat source unit controller.

Advantageous Effects of Invention

In the air-conditioning apparatus configured as above, each of the remote controllers includes the temperature sensor (for detecting the temperature of the corresponding space to be air-conditioned), corresponding to the sucked air temperature sensor provided in each of the indoor units of the conventional air-conditioning apparatus. Accordingly, the air-conditioning apparatus thus configured enables the instruction to start and stop the operation and the data of the target temperature and the temperature detected by the temperature sensor to be directly transmitted from each of the remote controllers to the heat source unit controller. Therefore, the air-conditioning apparatus according to the present invention suppresses an increase in communication traffic despite the number of indoor units being increased.

BRIEF DESCRIPTION OF DRAWINGS

FIG. 5 is a circuit diagram showing the flow of refrigerant in the air-conditioning apparatus shown in FIG. 2, in a cooling-main operation.

FIG. 7 is a table showing a list of communication items in the air-conditioning apparatus according to Embodiment of the present invention.

DESCRIPTION OF EMBODIMENT

Embodiment

Figure 1:
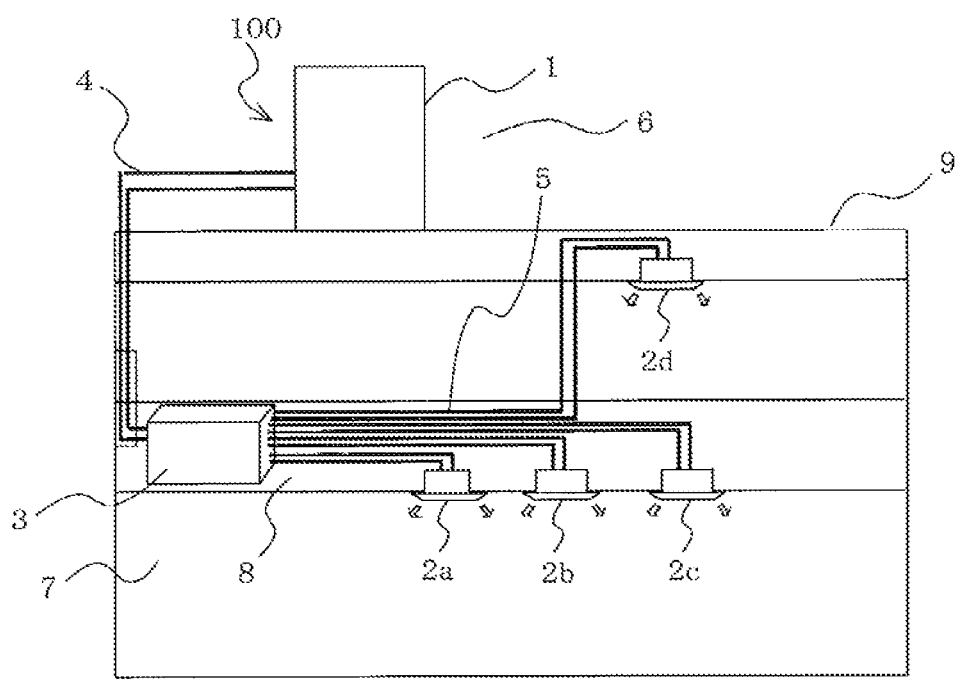
FIG. 1 is a schematic drawing showing an installation example of an air-conditioning apparatus according to Embodiment of the present invention.

FIG. 1 is a schematic drawing showing an installation example of an air-conditioning apparatus according to Embodiment of the present invention. Referring to FIG. 1, an installation example of an air-conditioning apparatus 100 will be described. The air-conditioning apparatus 100 includes a refrigeration cycle in which refrigerant circulates, and indoor units 2a to 2d are configured to select an operation mode as desired, either a cooling mode or a heating mode. The air-conditioning apparatus 100 according to Embodiment includes a refrigerant circuit A (see FIG. 2), and a heat medium circuit B (see FIG. 2). Examples of the refrigerant that may be employed in the refrigerant circuit A include a single mixed refrigerant such as R-22, R-32, or R-134a, a pseudo-azeotropic refrigerant mixture such as R-410A or R-404A, a non-azeotropic refrigerant mixture such as R-407C, refrigerant containing a double bond in the formula and having a relatively low global warming potential such as $CF_3CF=CH_2$, or a mixture thereof, or a natural refrigerant such as $CO_2$ or propane. In the heat medium circuit B, for example water is employed as the heat medium.

The air-conditioning apparatus 100 according to Embodiment adopts an indirect method in which the refrigerant (heat source-side refrigerant) is indirectly utilized. Specifically, cooling energy or heating energy retained by the heat source-side refrigerant is transmitted to another refrigerant (hereinafter, heat medium) different from the heat source-side refrigerant, so as to cool or heat a space to be air-conditioned with the cooling energy or heating energy retained by the heat medium.

As shown in FIG. 1, the air-conditioning apparatus 100 according to Embodiment includes an outdoor unit 1 serving as the heat source unit, a plurality of indoor units 2, and a heat medium converter 3 interposed between the outdoor unit 1 and the indoor units 2. The heat medium converter 3 serves for heat exchange between the heat source-side refrigerant and the heat medium. The outdoor unit 1 and the heat medium converter 3 are connected to each other via a refrigerant pipe 4 in which the heat source-side refrigerant circulates. The heat medium converter 3 and each of the indoor units 2 are connected to each other via a pipe (heat medium pipe) 5 in which the heat medium circulates. The cooling energy or heating energy generated in the outdoor unit 1 is distributed to the indoor units 2 through the heat medium converter 3.

The outdoor unit 1 is normally installed in an outdoor space 6 (e.g., roof) outside an architectural structure, for example a building 9, and serves to supply cooling energy or heating energy to the indoor units 2 through the heat medium converter 3.

The indoor units 2 are each located at a position appropriate for supplying cooling air or heating air into an indoor space 7 inside the building 9, for example a living room, and supply the cooling air or heating air into the indoor space 7 which is the space to be air-conditioned.

The heat medium converter 3 is placed in a separate casing from the outdoor unit 1 and the indoor unit 2, and installed at a different position from the outdoor space 6 and the indoor space 7. The heat medium converter 3 is connected to the outdoor unit 1 and the indoor unit 2 via the refrigerant pipe 4 and the pipe 5, respectively, and serves to transmit the cooling energy or heating energy supplied from the outdoor unit 1, to the indoor unit 2.

As shown in FIG. 1, in the air-conditioning apparatus 100 according to Embodiment, the outdoor unit 1 and the heat medium converter 3 are connected to each other via the refrigerant pipe 4 routed in two lines, and the heat medium converter 3 and each of the indoor units 2a to 2d are connected to each other via the pipe 5 routed in two lines. Thus, in the air-conditioning apparatus 100 according to Embodiment 1, the units (outdoor unit 1, indoor units 2, and heat medium converter 3) are connected to each other via the refrigerant pipe 4 and the pipe 5, which facilitates the installation work.

Here, FIG. 1 illustrates the case where the heat medium converter 3 is located inside the building 9 but in a space different from the indoor space 7 (e.g., a place above the ceiling of the building 9, hereinafter simply "space 8"). Instead, the heat medium converter 3 may be located, for example, in a common-use space where an elevator is installed. In addition, although FIG. 1 illustrates the indoor units 2 of a ceiling cassette type, different types may be adopted. The air-conditioning apparatus 100 may be installed in any desired manner, for example recessed in the ceiling or suspended from the ceiling, so long as the heating air or cooling air can be blown into the indoor space 7 directly or through a duct or the like.

The heat medium converter 3 may also be located in the vicinity of the outdoor unit 1. It is to be noted, however, that installing the heat medium converter 3 far from the indoor units 2 leads to an increase in power consumption for transporting the heat medium, which is undesirable from the viewpoint of energy saving.

Figure 2:
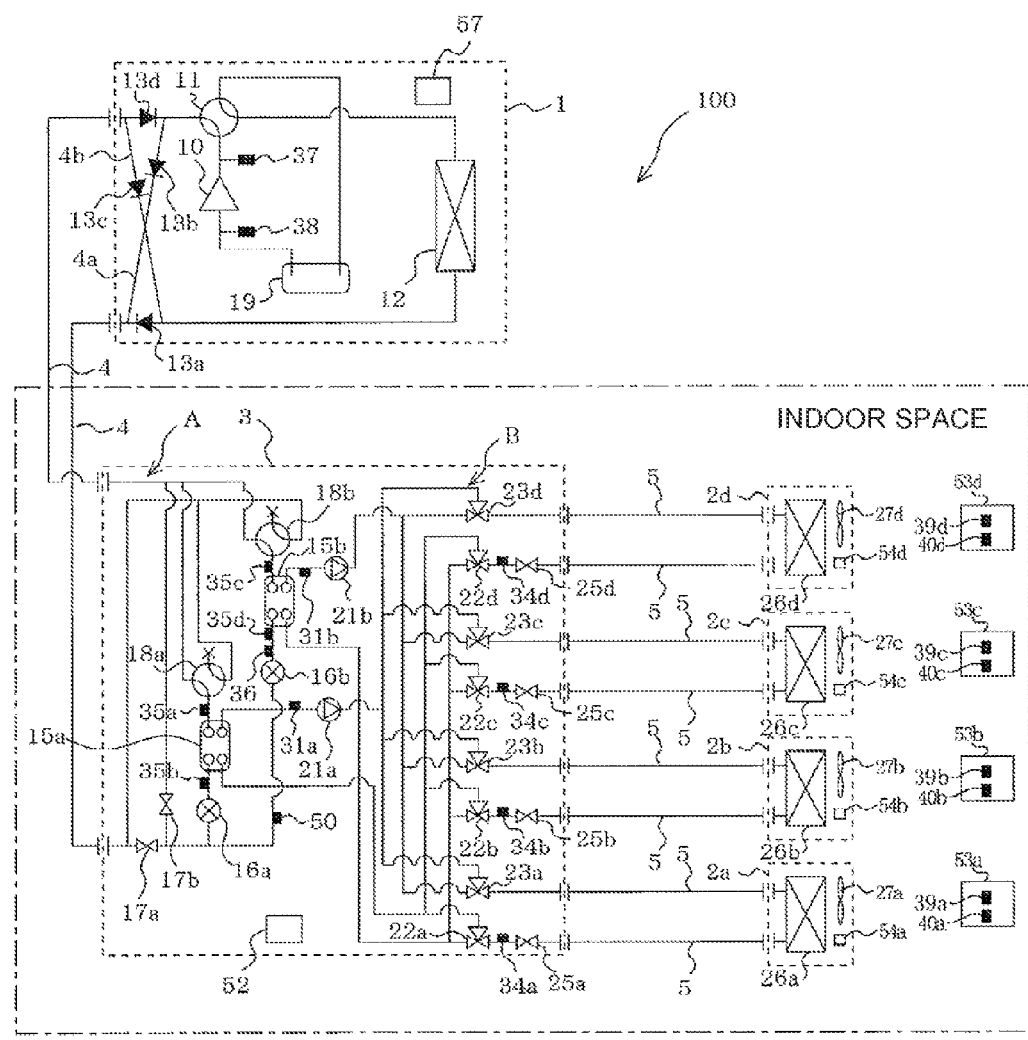
FIG. 2 is a schematic diagram showing a configuration of a refrigerant circuit in the air-conditioning apparatus according to Embodiment of the present invention.

FIG. 2 is a schematic diagram showing a configuration of a refrigerant circuit in the air-conditioning apparatus according to Embodiment of the present invention.

As shown in FIG. 2, the outdoor unit 1 and the heat medium converter 3 are connected to each other via the refrigerant pipe 4 routed through an intermediate heat exchanger 15a and an intermediate heat exchanger 15b provided in the heat medium converter 3. The heat medium converter 3 and the indoor units 2 are also connected via the pipe 5. The refrigerant pipe 4 will be subsequently described in details.

[Outdoor Unit 1]

The outdoor unit 1 includes a compressor 10 that compresses the refrigerant, a first refrigerant flow switching device 11 constituted of, for example, a four-way valve, a heat source-side heat exchanger 12 that serves as an evaporator or a condenser, and an accumulator 19 that stores a surplus of the refrigerant, which are connected via the refrigerant pipe 4.

The outdoor unit 1 also includes a first connection pipe 4a, a second connection pipe 4b, a check valve 13a, a check valve 13b, a check valve 13c, and a check valve 13d. Providing the first connection pipe 4a, the second connection pipe 4b, the check valve 13a, the check valve 13b, the check valve 13c, and the check valve 13d allows the heat source-side refrigerant flowing into the heat medium converter 3 to flow only in a predetermined direction, irrespective of the operation mode required by the indoor units 2.

The compressor 10 sucks the heat source-side refrigerant and compresses the heat source-side refrigerant into a high-temperature/high-pressure state, and may be constituted of, for example, a variable-capacity inverter compressor.

The first refrigerant flow switching device 11 serves to switch the flow of the heat source-side refrigerant, between a flow in a heating operation mode (heating-only operation mode and heating-main operation mode) and a flow in a cooling operation mode (cooling-only operation mode and cooling-main operation mode). To be more detailed, the first refrigerant flow switching device 11 switches the flow path of the heat source-side refrigerant discharged from the compressor 10, between the heating operation mode (heating-only operation mode and heating-main operation mode) and the cooling operation mode (cooling-only operation mode and cooling-main operation mode).

The heat source-side heat exchanger 12 serves as an evaporator in the heating operation and a condenser in the cooling operation, to exchange heat between air supplied from a non-illustrated outdoor air-sending device such as a fan and the heat source-side refrigerant.

The accumulator 19 is provided on the suction side of the compressor 10.

In addition, a second pressure sensor 37 and a third pressure sensor 38 as pressure detecting devices are respectively provided on the inlet side and the outlet side of the compressor 10, so as to calculate the flow rate of the refrigerant on the basis of the rotation speed of the compressor 10 and the values detected by the pressure sensors 37, 38.

[Indoor Unit 2]

The indoor units 2 each include a use-side heat exchanger 26. The use-side heat exchanger 26 is connected to a heat medium flow control device 25 and a second heat medium flow switching device 23 of the heat medium converter 3, via the pipe 5. The use-side heat exchanger 26 serves to exchange heat between the heat medium and air supplied by an indoor air-sending device 27, such as a fan, to thereby generate the heating air or cooling air to be supplied to the indoor space 7.

[Heat Medium Converter 3]

The heat medium converter 3 includes two intermediate heat exchangers 15a and 15b in which the refrigerant and the heat medium exchange heat with each other, two expansion devices 16a and 16b for depressurizing the refrigerant, two open/close devices 17a and 17b for opening and closing the flow path in the refrigerant pipe 4, two second refrigerant flow switching devices 18a and 18b for switching the flow path of the refrigerant, two pumps 21a and 21b for causing the heat medium to circulate, four first heat medium flow switching devices 22a to 22d each connected to a line of the pipe 5, four second heat medium flow switching devices 23a to 23d each connected to the other line of the pipe 5, and four heat medium flow control devices 25a to 25d each connected to the pipe 5 to which the second heat medium flow switching devices 22a to 22d are connected.

The two intermediate heat exchangers 15a, 15b (may be collectively referred to as intermediate heat exchanger 15) act as a condenser (radiator) or an evaporator, to exchange heat between the heat source-side refrigerant and the heat medium and transmit the cooling energy or heating energy generated in the outdoor unit 1 and retained by the heat source-side refrigerant, to the heat medium. The intermediate heat exchanger 15a is provided between the expansion device 16a and the second refrigerant flow switching device 18a in the refrigerant circuit A, for cooling the heat medium in a cooling and heating mixed operation mode. The intermediate heat exchanger 15b is provided between the expansion device 16b and the second refrigerant flow switching device 18b in the refrigerant circuit A, for heating the heat medium in the cooling and heating mixed operation mode.

The two expansion devices 16a, 16b (may be collectively referred to as expansion device 16) have the function of a pressure reducing valve or an expansion valve, to depressurize and expand the heat source-side refrigerant. The expansion device 16a is located upstream of the intermediate heat exchanger 15a, in the flow of the heat source-side refrigerant arranged for the cooling-only operation mode. The expansion device 16b is located upstream of the intermediate heat exchanger 15b in the flow of the heat source-side refrigerant arranged for the cooling-only operation mode. The expansion device 16 may be constituted of, for example, an electronic expansion valve with variable opening degree.

The open/close devices 17a, 17b are constituted of a two-way valve for example, and serve to open and close the refrigerant pipe 4.

The two second refrigerant flow switching devices 18a, 18b (may be collectively referred to as second refrigerant flow switching device 18) are each constituted of a four-way valve for example, and serve to switch the flow of the heat source-side refrigerant depending on the operation mode. The second refrigerant flow switching device 18a is located downstream of the intermediate heat exchanger 15a, in the flow of the heat source-side refrigerant arranged for the cooling-only operation mode. The second refrigerant flow switching device 18b is located downstream of the intermediate heat exchanger 15b, in the flow of the heat source-side refrigerant arranged for the cooling-only operation mode.

The two pumps 21a, 21b (may be collectively referred to as pump 21) serve to cause the heat medium to circulate in the pipe 5. The pump 21a is located in the pipe 5 at a position between the intermediate heat exchanger 15a and the second heat medium flow switching device 23. The pump 21b is located in the pipe 5 at a position between the intermediate heat exchanger 15b and the second heat medium flow switching device 23. The pump 21 may be constituted of a variable-capacity valve, for example. Here, the pump 21a may be provided to the pipe 5 at a position between the intermediate heat exchanger 15a and the first heat medium flow switching device 22. Likewise, the pump 21b may be provided to the pipe 5 at a position between the intermediate heat exchanger 15b and the first heat medium flow switching device 22.

The four first heat medium flow switching devices 22a to 22d (may be collectively referred to as first heat medium flow switching device 22) are each constituted of a three-way valve for example, and serve to switch the flow path of the heat medium. The number of first heat medium flow switching devices 22 corresponds to the number of indoor units 2a to 2d (four in Embodiment). The first heat medium flow switching device 22 is provided on the outlet side of the heat medium flow path of the corresponding use-side heat exchanger 26a, with one of the three ways connected to the intermediate heat exchanger 15a, another way connected to the intermediate heat exchanger 15b, and the remaining way connected to the heat medium flow control device 25. The first heat medium flow switching device 22 is numbered as first heat medium flow switching device 22a, first heat medium flow switching device 22b, first heat medium flow switching device 22c, and first heat medium flow switching device 22d from the bottom of FIG. 2, so as to correspond to the indoor units 2a to 2d. Although FIG. 2 illustrates the numerals 22a, 22b, 22c, and 22d in the heat medium converter 3, the number of first heat medium flow switching devices 22a may be increased in accordance with the number of indoor units 2 included in the system.

The four second heat medium flow switching devices 23a to 23d (may be collectively referred to as second heat medium flow switching device 23) are each constituted of a three-way valve for example, and serve to switch the flow path of the heat medium. The number of second heat medium flow switching devices 23 corresponds to the number of indoor units 2 (four in Embodiment). The second heat medium flow switching device 23 is provided on the inlet side of the heat medium flow path of the corresponding use-side heat exchanger 26, with one of the three ways connected to the intermediate heat exchanger 15a, another way connected to the intermediate heat exchanger 15b, and the remaining way connected to the use-side heat exchanger 26. The second heat medium flow switching device 23 is numbered as second heat medium flow switching device 23a, second heat medium flow switching device 23b, second heat medium flow switching device 23c, and second heat medium flow switching device 23d from the bottom of FIG. 2, so as to correspond to the indoor units 2a to 2d. Although FIG. 2 illustrates the numerals 23a, 23b, 23c, and 23d in the heat medium converter 3, the number of second heat medium flow switching devices 23 may be increased in accordance with the number of indoor units 2 included in the system.

The four heat medium flow control devices 25a to 25d (may be collectively referred to as heat medium flow control device 25) are each constituted of, for example, a two-way valve with variable opening degree, and serve to control the flow rate of the heat medium flowing in the pipe 5. The number of heat medium flow control devices 25 corresponds to the number of indoor units 2 (four in Embodiment). The heat medium flow control device 25 is located on the outlet side of the heat medium flow path of the corresponding use-side heat exchanger 26, with one way connected to the use-side heat exchanger 26 and the other way connected to the first heat medium flow switching device 22. The heat medium flow control device 25 is numbered as heat medium flow control device 25a, heat medium flow control device 25b, heat medium flow control device 25c, and heat medium flow control device 25d from the bottom in FIG. 2, so as to correspond to the indoor units 2a to 2d. Although FIG. 2 illustrates the numerals 25a, 25b, 25c, and 25d in the heat medium converter 3, the number of heat medium flow control devices 25 may be increased in accordance with the number of indoor units 2 included in the system.

In addition, the heat medium flow control device 25 may be provided on the inlet side of the heat medium flow path of the use-side heat exchanger 26.

Further, the heat medium converter 3 includes various sensors (two first temperature sensors 31a, 31b, four second temperature sensors 34a to 34d, four third temperature sensors 35a to 35d, a fourth temperature sensor 50, and a first pressure sensor 36). The information detected by these sensors (for example, temperature information and pressure information) is transmitted to a controller that controls the overall operation of the air-conditioning apparatus 100, to be utilized for controlling the driving frequency of the compressor 10, the rotation speed of a non-illustrated outdoor air-sending device located in the vicinity of the heat source-side heat exchanger 12 and the indoor air-sending device 27 located in the vicinity of the use-side heat exchanger 26, the switching of the first refrigerant flow switching device 11, the driving frequency of the pump 21, the switching of the second refrigerant flow switching device 18, and the switching of the flow path of the heat medium.

In Embodiment, the mentioned controller is composed of an outdoor unit controller 57 provided in the outdoor unit 1, a heat medium converter controller 52 provided in the heat medium converter 3, and an indoor unit controller 54 provided in each of the indoor units 2. The outdoor unit controller 57, the heat medium converter controller 52, and the indoor unit controller 54 are, for example, constituted of a microcomputer.

In addition, the air-conditioning apparatus 100 includes a plurality of remote controllers (may be collectively referred to as remote controller 53) respectively associated with the indoor units 2. In Embodiment, the remote controllers 53a to 53d are respectively provided for the indoor units 2a to 2d. The remote controllers 53a to 53d respectively include temperature sensors 39a to 39d (temperature sensors corresponding to the sucked air temperature sensor in the conventional air-conditioning apparatus) for detecting the temperature of the space to be air-conditioned by the corresponding indoor unit 2, and target temperature setting units 40a to 40d for setting the target temperature of the space to be air-conditioned by the corresponding indoor unit 2 (desired temperature of the space to be air-conditioned).

The outdoor unit controller 57, the heat medium converter controller 52, and the indoor unit controller 54 execute the following control to maximize the performance of the air-conditioning apparatus 100.

The outdoor unit controller 57 controls the rotation speed of the compressor 10 and the rotation speed (including turning on and off) of the outdoor air-sending device so that the pressure detected by the second pressure sensor 37 and the third pressure sensor 38 meets a predetermined target. The outdoor unit controller 57 also controls the flow path setting of the first refrigerant flow switching device 11 and the rotation speed (including turning on and off) of the outdoor air-sending device, on the basis of information about the operation mode for example, transmitted from the remote controllers 53a to 53d through the heat medium converter controller 52.

The heat medium converter controller 52 calculates a degree of superheating or subcooling on the side of the refrigerant circuit A in the intermediate heat exchanger 15 on the basis of the value detected by the third temperature sensor 35, and controls the opening degree of the expansion device 16. The heat medium converter controller 52 also controls the flow path setting of the second refrigerant flow switching device 18, the opening and closing of the open/close devices 17a, 17b, the switching of the first heat medium flow switching device 22, the switching of the second heat medium flow switching device 23, the opening degree of the heat medium flow control device 25, and the rotation speed of the pump 21, on the basis of the information about the operation mode for example, transmitted from the remote controllers 53a to 53d.

The indoor unit controllers 54 control the rotation speed (including turning on and off) of the indoor air-sending device 27 in accordance with data of the rotation speed (for example, high, medium, and low) of the indoor air-sending device 27 transmitted from the remote controllers 53a to 53d.

The two first temperature sensors 31a, 31b (may be collectively referred to as first temperature sensor 31) serve to detect the temperature of the heat medium flowing out of the intermediate heat exchanger 15, in other words the temperature of the heat medium at the outlet of the intermediate heat exchanger 15, and may preferably be constituted of a thermistor. The first temperature sensor 31a is provided to the pipe 5 at the inlet of the pump 21a, and the first temperature sensor 31b is provided to the pipe 5 at the inlet of the pump 21b.

The four second temperature sensors 34a to 34d (may be collectively referred to as second temperature sensor 34) are provided between the corresponding first heat medium flow switching device 22 and the corresponding heat medium flow control device 25 to detect the temperature of the heat medium flowing out of the use-side heat exchanger 26, and may be constituted of a thermistor. The number of second temperature sensors 34 corresponds to the number of indoor units 2 (four in Embodiment). The second temperature sensor 34 is numbered as second temperature sensor 34a, 34b, 34c, and 34d from the bottom in FIG. 2, so as to correspond to the indoor units 2.

The four third temperature sensors 35a to 35d (may be collectively referred to as third temperature sensor 35) serve to detect the temperature of the heat source-side refrigerant flowing into or out of the intermediate heat exchanger 15, and may preferably be constituted of a thermistor. The third temperature sensors 35a to 35d are respectively provided at the inlet side and the outlet side on the heat source-side refrigerant side of the intermediate heat exchanger 15. The third temperature sensor 35a is provided between the intermediate heat exchanger 15a and the second refrigerant flow switching device 18a, and the third temperature sensor 35b is provided between the intermediate heat exchanger 15a and the expansion device 16a. The third temperature sensor 35c is provided between the intermediate heat exchanger 15b and the second refrigerant flow switching device 18b, and the third temperature sensor 35d is provided between the intermediate heat exchanger 15b and the expansion device 16b.

The fourth temperature sensor 50 serves to provide the temperature information used for calculating an evaporation temperature and a condensation temperature, and is provided between the expansion device 16a and the expansion device 16b.

The pipe 5 in which the heat medium flows includes a section connected to the intermediate heat exchanger 15a and a section connected to the intermediate heat exchanger 15b. The pipe 5 is split into the number of branches (four in Embodiment) corresponding to the number of indoor units 2 connected to the heat medium converter 3. The pipe 5 is connected at the first heat medium flow switching device 22, and the second heat medium flow switching device 23. By controlling the action of the first heat medium flow switching device 22 and the second heat medium flow switching device 23, it is decided whether the heat medium from the intermediate heat exchanger 15a or the heat medium from the intermediate heat exchanger 15b is to be introduced into the use-side heat exchanger 26.

[Description of Operation Modes]

In the air-conditioning apparatus 100, the compressor 10, the first refrigerant flow switching device 11, the heat source-side heat exchanger 12, the open/close devices 17, the second refrigerant flow switching device 18, the refrigerant flow path of the intermediate heat exchanger 15a, the expansion device 16, and the accumulator 19 are connected via the refrigerant pipe 4, so as to constitute the refrigerant circuit A in the heat medium converter 3. In addition, the heat medium flow path of the intermediate heat exchanger 15a, the pump 21, the first heat medium flow switching device 22, the heat medium flow control device 25, the use-side heat exchanger 26, and the second heat medium flow switching device 23 are connected via the pipe 5, so as to constitute the heat medium circuit B. In other words, the plurality of use-side heat exchangers 26 are each connected in parallel to each of the intermediate heat exchangers 15, thus making the heat medium circuit B multiple systems.

Thus, in the air-conditioning apparatus 100 the outdoor unit 1 and the heat medium converter 3 are connected to each other via the intermediate heat exchanger 15a and the intermediate heat exchanger 15b provided in the heat medium converter 3, and the heat medium converter 3 and each of the indoor units 2 are connected to each other via the intermediate heat exchanger 15a and the intermediate heat exchanger 15b. In the air-conditioning apparatus 100, therefore, the heat source-side refrigerant circulating in the refrigerant circuit A and the heat medium circulating in the heat medium circuit B exchange heat with each other in the intermediate heat exchanger 15a and the intermediate heat exchanger 15b.

The operation modes performed by the air-conditioning apparatus 100 will be described hereunder. The air-conditioning apparatus 100 is configured to allow the corresponding indoor unit 2 to perform the cooling operation or heating operation, in accordance with an instruction received from each of the indoor units 2. Further, the air-conditioning apparatus 100 is configured to allow all of the indoor units 2 to perform the same operation, or allow each of the indoor units 2 to perform a different operation.

The operation modes that the air-conditioning apparatus 100 is configured to perform include a cooling-only operation mode in which all of the indoor units 2 in operation perform the cooling operation, a heating-only operation mode in which all of the indoor units 2 in operation perform the heating operation, a cooling-main operation mode in which the load of cooling is greater of a cooling and heating mixed operation, and a heating-main operation mode in which the load of heating is greater of the cooling and heating mixed operation. Each of these operation modes will be described hereunder, along with the flows of the heat source-side refrigerant and the heat medium.

[Cooling-Only Operation Mode]

Figure 3:
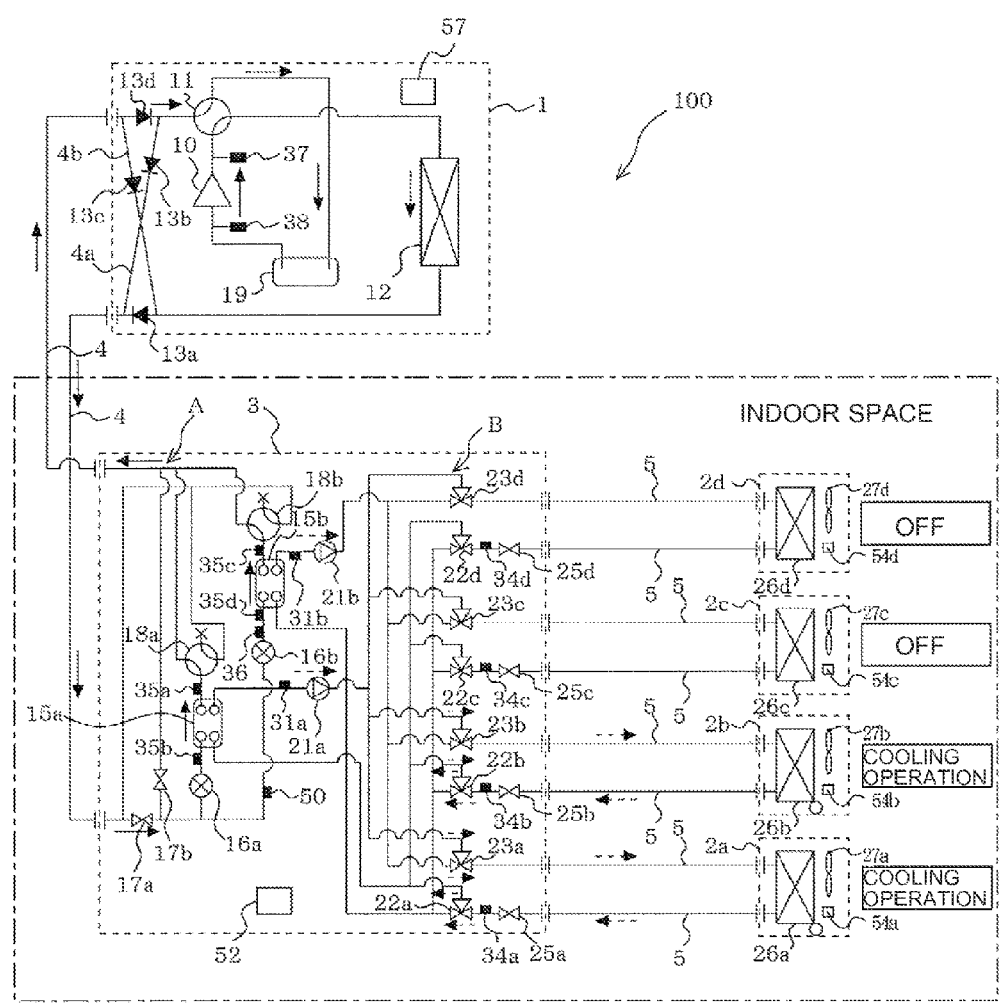
FIG. 3 is a circuit diagram showing the flow of refrigerant in the air-conditioning apparatus shown in FIG. 2, in a cooling-only operation.

FIG. 3 is a circuit diagram showing the flow of refrigerant in the air-conditioning apparatus 100 shown in FIG. 2, in the cooling-only operation (pattern 1). Referring to FIG. 3, the cooling-only operation mode will be described on the assumption that a cooling load has arisen in the indoor units associated with the use-side heat exchangers 26a and 26b. In FIG. 3, the flow of the heat source-side refrigerant is indicated by solid arrows and the flow of the heat medium is indicated by broken-line arrows.

In the cooling-only operation mode shown in FIG. 3, the first refrigerant flow switching device 11 is switched so as to cause the heat source-side refrigerant discharged from the compressor 10 to flow into the heat source-side heat exchanger 12, in the outdoor unit 1. In the heat medium converter 3, the pump 21a and the pump 21b are driven with the heat medium flow control devices 25a, 25b fully opened and the heat medium flow control devices 25c, 25d fully close, so that the heat medium circulates between each of the intermediate heat exchanger 15a and the intermediate heat exchanger 15b and the use-side heat exchangers 26a and 26b.

The flow of the heat source-side refrigerant in the refrigerant circuit A will first be described.

The refrigerant in a low-temperature/low-pressure state is compressed by the compressor 10 and discharged therefrom in the form of high-temperature/high-pressure gas refrigerant. The high-temperature/high-pressure gas refrigerant discharged from the compressor 10 flows into the heat source-side heat exchanger 12 through the first refrigerant flow switching device 11, and transmits heat to outdoor air in the heat source-side heat exchanger 12 thereby turning into high-pressure liquid refrigerant. The high-pressure refrigerant which has flowed out of the heat source-side heat exchanger 12 flows out of the outdoor unit 1 through the check valve 13a, and flows into the heat medium converter 3 through the refrigerant pipe 4. The high-pressure refrigerant which has entered the heat medium converter 3 is branched after passing through the open/close device 17a and then expanded in the expansion device 16a and the expansion device 16b so as to turn into low-temperature/low-pressure two-phase refrigerant. Here, the open/close device 17b is closed.

The two-phase refrigerant flows into each of the intermediate heat exchanger 15a and the intermediate heat exchanger 15b acting as an evaporator, and cools the heat medium circulating in the heat medium circuit B by removing heat from the heat medium, thereby turning into low-temperature/low-pressure gas refrigerant. The gas refrigerant which has flowed out of the intermediate heat exchanger 15a and the intermediate heat exchanger 15b flows out of the heat medium converter 3 through the second refrigerant flow switching device 18a and the second refrigerant flow switching device 18b, and again flows into the outdoor unit 1 through the refrigerant pipe 4. The refrigerant which has entered the outdoor unit 1 passes through the check valve 13d, and is again sucked into the compressor 10 through the first refrigerant flow switching device 11 and the accumulator 19.

In the mentioned process, the second refrigerant flow switching device 18a and the second refrigerant flow switching device 18b communicate with the low-pressure pipe. In addition, the opening degree of the expansion device 16a is controlled so as to keep a degree of superheating at a constant level, the degree of superheating representing a difference between the temperature detected by the third temperature sensor 35a and the temperature detected by the third temperature sensor 35b. Likewise, the opening degree of the expansion device 16b is controlled so as to keep a degree of superheating at a constant level, the degree of superheating representing a difference between the temperature detected by the third temperature sensor 35c and the temperature detected by the third temperature sensor 35d.

The flow of the heat medium in the heat medium circuit B will now be described.

In the cooling-only operation mode, the cooling energy of the heat source-side refrigerant is transmitted to the heat medium in both of the intermediate heat exchanger 15a and the intermediate heat exchanger 15b, and the cooled heat medium is driven by the pumps 21a and the pump 21b to flow through the pipe 5. The heat medium pressurized in the pump 21a and the pump 21b and discharged therefrom flows into each of the use-side heat exchangers 26a and 26b through the second heat medium flow switching device 23a and the second heat medium flow switching device 23b, respectively. Then the heat medium removes heat from indoor air in the use-side heat exchanger 26a and the use-side heat exchanger 26b, thereby cooling the indoor space 7.

Thereafter, the heat medium flows out of the use-side heat exchanger 26a and the use-side heat exchanger 26b and flows into the heat medium flow control device 25a and the heat medium flow control device 25b. In the mentioned process, the heat medium flows into the use-side heat exchanger 26a and the use-side heat exchanger 26b at a flow rate controlled so as to satisfy the air-conditioning load required in the indoor space, by the heat medium flow control device 25a and the heat medium flow control device 25b, respectively. The heat medium which has flowed out of the heat medium flow control device 25a and the heat medium flow control device 25b passes through the first heat medium flow switching device 22a and the first heat medium flow switching device 22b, respectively, and flows into the intermediate heat exchanger 15a and the intermediate heat exchanger 15b, and is again sucked into the pump 21a and the pump 21b.

In the pipe 5 in the use-side heat exchanger 26a and the use-side heat exchanger 26b, the heat medium flows in the direction from the second heat medium flow switching device 23 toward the first heat medium flow switching device 22 through the heat medium flow control device 25. The air-conditioning load required in the indoor space 7 can be satisfied by controlling so as to maintain at a target value the difference between the temperature detected by the first temperature sensor 31a or the temperature detected by the first temperature sensor 31b and the temperature detected by the second temperature sensor 34a or 34b. Either of the temperatures detected by the first temperature sensor 31a and the first temperature sensor 31b, or the average temperature thereof, may be adopted as the temperature at the outlet of the intermediate heat exchanger 15. In the mentioned process, the first heat medium flow switching device 22 and the second heat medium flow switching device 23 are set to an intermediate opening degree, so as to secure the flow path conducting to both of the intermediate heat exchanger 15a and the intermediate heat exchanger 15b.

During the cooling-only operation mode, the flow path to the use-side heat exchanger 26 where the thermal load has not arisen (including a state where a thermostat is off) is closed by the heat medium flow control device 25 to restrict the flow of the heat medium, since it is not necessary to supply the heat medium to such use-side heat exchanger 26. In FIG. 3, the thermal load is present in the use-side heat exchangers 26a, 26b and hence the heat medium is supplied thereto, however since the use-side heat exchangers 26c, 26d are not to be activated, the corresponding heat medium flow control device 25c and heat medium flow control device 25d are fully closed. When the thermal load arises in these use-side heat exchangers, the heat medium flow control device 25 may be opened so as to allow the heat medium to circulate.

[Heating Only Operation Mode]

Figure 4:
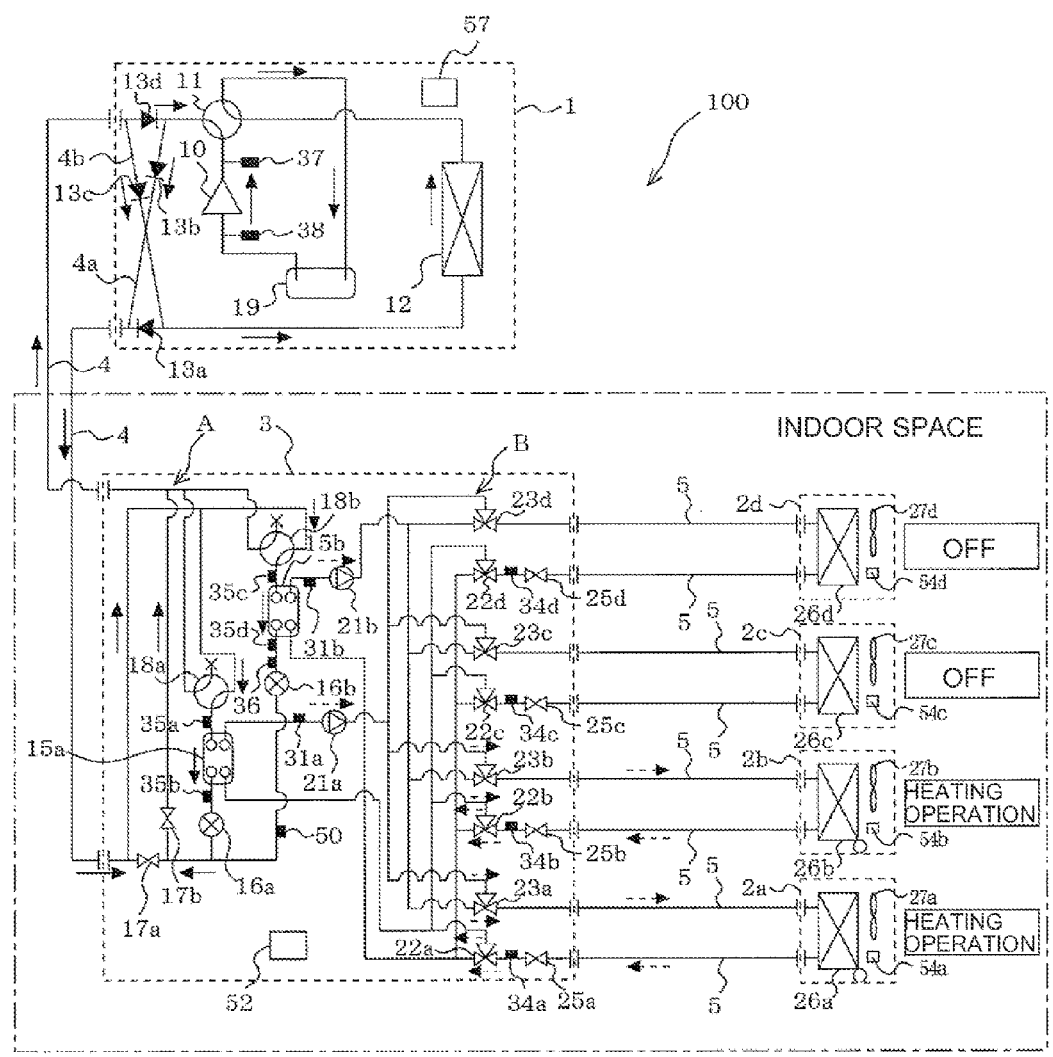
FIG. 4 is a circuit diagram showing the flow of refrigerant in the air-conditioning apparatus shown in FIG. 2, in a heating-only operation.

FIG. 4 is a refrigerant circuit diagram showing the flow of the heat medium in the heating-only operation mode of the air-conditioning apparatus 100 shown in FIG. 2. Referring to FIG. 4, the heating-only operation mode will be described on the assumption that a heating load has arisen in the use-side heat exchangers 26a, 26b. In FIG. 4, the flow of the heat source-side refrigerant is indicated by solid arrows and the flow of the heat medium is indicated by broken-line arrows.

In the heating-only operation mode shown in FIG. 4, the first refrigerant flow switching device 11 is switched so as to cause the heat source-side refrigerant discharged from the compressor 10 to flow into the heat medium converter 3 without passing through the heat source-side heat exchanger 12, in the outdoor unit 1. In the heat medium converter 3, the pump 21a and the pump 21b are driven with the heat medium flow control devices 25a, 25b fully opened and the heat medium flow control devices 25c, 25d fully closed, so that the heat medium circulates between each of the intermediate heat exchanger 15a and the intermediate heat exchanger 15b and the use-side heat exchangers 26a, 26b.

The flow of the heat source-side refrigerant in the refrigerant circuit A will first be described. The heat source-side refrigerant in a low-temperature/low-pressure state is compressed by the compressor 10 and discharged therefrom in the form of high-temperature/high-pressure gas refrigerant. The high-temperature/high-pressure gas refrigerant discharged from the compressor 10 passes through the first refrigerant flow switching device 11 and the check valve 13b, and flows out of the outdoor unit 1. The high-temperature/high-pressure gas refrigerant which has flowed out of the outdoor unit 1 is flows into the heat medium converter 3 through the refrigerant pipe 4. The high-temperature/high-pressure gas refrigerant which has entered the heat medium converter 3 is branched and passes through the second refrigerant flow switching device 18a and the second refrigerant flow switching device 18b, and flows into each of the intermediate heat exchanger 15a and the intermediate heat exchanger 15b.

The high-temperature/high-pressure gas refrigerant which has entered the intermediate heat exchanger 15a and the intermediate heat exchanger 15b transmits heat to the heat medium circulating in the heat medium circuit B, thereby turning into high-pressure liquid refrigerant. The liquid refrigerant which has flowed out of the intermediate heat exchanger 15a and the intermediate heat exchanger 15b is expanded in the expansion device 16a and the expansion device 16b thereby turning into low-temperature/low-pressure two-phase refrigerant. The two-phase refrigerant flows out of the heat medium converter 3 through the open/close device 17b, and again flows into the outdoor unit 1 through the refrigerant pipe 4. Here the, open/close device 17a is closed.

The refrigerant which has entered the outdoor unit 1 flows into the heat source-side heat exchanger 12 acting as an evaporator, through the check valve 13c. The refrigerant which has entered the heat source-side heat exchanger 12 removes heat from outdoor air in the heat source-side heat exchanger 12 thereby turning into low-temperature/low-pressure gas refrigerant. The low-temperature/low-pressure gas refrigerant which has flowed out of the heat source-side heat exchanger 12 is again sucked into the compressor 10, through the first refrigerant flow switching device 11 and the accumulator 19.

In the mentioned process, the second refrigerant flow switching device 18a and the second refrigerant flow switching device 18b communicate with the high-pressure pipe. In addition, the opening degree of the expansion device 16a is controlled so as to keep a degree of subcooling at a constant level, the degree of subcooling representing a difference between a saturation temperature converted from the pressure detected by the pressure sensor 36 and the temperature detected by the third temperature sensor 35b. Likewise, the opening degree of the expansion device 16b is controlled so as to keep a degree of subcooling at a constant level, the degree of subcooling representing a difference between a saturation temperature converted from the pressure detected by the pressure sensor 36 and the temperature detected by the third temperature sensor 35d. Here, in the case where the temperature at an intermediate position of the intermediate heat exchanger 15 can be measured, the temperature at the intermediate position may be used instead of the pressure sensor 36, in which case the system can be formed at a lower cost.

The flow of the heat medium in the heat medium circuit B will now be described.

In the heating-only operation mode, the heating energy of the heat source-side refrigerant is transmitted to the heat medium in both of the intermediate heat exchanger 15a and the intermediate heat exchanger 15b, and the heated heat medium is driven by the pump 21a and the pump 21b to flow through the pipe 5. The heat medium pressurized in the pump 21a and the pump 21b and discharged therefrom flows into the use-side heat exchanger 26a and the use-side heat exchanger 26b through the second heat medium flow switching device 23a and the second heat medium flow switching device 23b, respectively. Then the heat medium transmits heat to indoor air in the use-side heat exchanger 26a and the use-side heat exchanger 26b, thereby heating the indoor space 7.

Thereafter, the heat medium flows out of the use-side heat exchanger 26a and the use-side heat exchanger 26b and flows into the heat medium flow control device 25a, the heat medium flow control device 25b, and the heat medium flow control device 25c. In the mentioned process, the heat medium flows into the use-side heat exchanger 26a and the use-side heat exchanger 26b at a flow rate controlled so as to satisfy the air-conditioning load required in the indoor space, by the heat medium flow control device 25a and the heat medium flow control device 25b, respectively. The heat medium which has flowed out of the heat medium flow control device 25a and the heat medium flow control device 25b passes through the first heat medium flow switching device 22a and the first heat medium flow switching device 22b and flows into the intermediate heat exchanger 15a and the intermediate heat exchanger 15b, and is again sucked into the pump 21a and the pump 21b.

In the pipe 5 in the use-side heat exchanger 26, the heat medium flows in the direction from the second heat medium flow switching device 23 toward the first heat medium flow switching device 22 through the heat medium flow control device 25. The air-conditioning load required in the indoor space 7 can be satisfied by controlling so as to maintain at a target value the difference between the temperature detected by the first temperature sensor 31a or the temperature detected by the first temperature sensor 31b and the temperature detected by the second temperature sensors 34a, 34b. Either of the temperatures detected by the first temperature sensor 31a and the first temperature sensor 31b, or the average temperature thereof, may be adopted as the temperature at the outlet of the intermediate heat exchanger 15.

In the mentioned process, the opening degree of the first heat medium flow switching device 22 and the second heat medium flow switching device 23 is set to an intermediate level to secure the flow path leading to both of the intermediate heat exchanger 15a and the intermediate heat exchanger 15b. Although in principle the use-side heat exchanger 26 is to be controlled on the basis of the difference in temperature between the inlet and the outlet thereof, actually the heat medium temperature at the inlet of the use-side heat exchanger 26 is nearly the same as the temperature detected by the first temperature sensor 31b. Therefore, adopting the value of the first temperature sensor 31b allows reduction of the number of temperature sensors, which leads to reduction in cost of the system.

During the heating-only operation mode, the flow path to the use-side heat exchanger 26 where the thermal load has not arisen (including a state where a thermostat is off) is closed by the heat medium flow control device 25 to restrict the flow of the heat medium, since it is not necessary to supply the heat medium to such use-side heat exchanger 26. In FIG. 4, the thermal load is present in the use-side heat exchangers 26a, 26b and hence the heat medium is supplied thereto, however since the use-side heat exchangers 26c, 26d are not to be activated, the corresponding heat medium flow control device 25c and heat medium flow control device 25d are fully closed. When the thermal load arises in these use-side heat exchangers, the heat medium flow control device 25 may be opened so as to allow the heat medium to circulate.

[Cooling Main Operation Mode]

FIG. 5 is a refrigerant circuit diagram showing the flow of the heat medium in the cooling-main operation mode of the air-conditioning apparatus 100 shown in FIG. 2. Referring to FIG. 5, the cooling-main operation mode will be described on the assumption that a heating load has arisen in the use-side heat exchanger 26d and a cooling load has arisen in the use-side heat exchangers 26a to 26c. In FIG. 5, the flow of the heat source-side refrigerant is indicated by solid arrows and the flow of the heat medium is indicated by broken-line arrows.

In the cooling-main operation mode shown in FIG. 5, the first refrigerant flow switching device 11 is switched so as to cause the heat source-side refrigerant discharged from the compressor 10 to flow into the heat source-side heat exchanger 12, in the outdoor unit 1. In the heat medium converter 3, the pump 21a and the pump 21b are driven with the heat medium flow control devices 25a to 25d fully opened, so that the heat medium circulates between the intermediate heat exchanger 15a and the use-side heat exchangers 26a to 26c, as well as between the intermediate heat exchanger 15b and the use-side heat exchanger 26d.

The flow of the heat source-side refrigerant in the refrigerant circuit A will first be described.

The heat source-side refrigerant in a low-temperature/low-pressure state is compressed by the compressor 10 and discharged therefrom in the form of high-temperature/high-pressure gas refrigerant. The high-temperature/high-pressure gas refrigerant discharged from the compressor 10 flows into the heat source-side heat exchanger 12 through the first refrigerant flow switching device 11, and transmits heat to outdoor air in the heat source-side heat exchanger 12 thereby turning into liquid refrigerant. The refrigerant which has flowed out of the heat source-side heat exchanger 12 flows out of the outdoor unit 1, and flows into the heat medium converter 3 through the check valve 13a and the refrigerant pipe 4. The refrigerant which has entered the heat medium converter 3 flows into the intermediate heat exchanger 15b acting as a condenser, through the second refrigerant flow switching device 18b.

The refrigerant which has entered the intermediate heat exchanger 15b transmits heat to the heat medium circulating in the heat medium circuit B, thereby further losing the temperature. The refrigerant which has flowed out of the intermediate heat exchanger 15b is expanded in the expansion device 16b so as to turn into low-pressure two-phase refrigerant. The low-pressure two-phase refrigerant flows into the intermediate heat exchanger 15a acting as an evaporator through the expansion device 16a. The low-pressure two-phase refrigerant which has entered the intermediate heat exchanger 15a cools the heat medium circulating in the heat medium circuit B by removing heat therefrom, thus turning into low-pressure gas refrigerant. The gas refrigerant flows out of the intermediate heat exchanger 15a, flows out of the heat medium converter 3 through the second refrigerant flow switching device 18a, and again flows into the outdoor unit 1 through the refrigerant pipe 4. The refrigerant which has entered the outdoor unit 1 passes through the check valve 13d, the first refrigerant flow switching device 11, and the accumulator 19, and is again sucked into the compressor 10.

In the mentioned process, the second refrigerant flow switching device 18a communicates with the low-pressure pipe, and the second refrigerant flow switching device 18b communicates with the high-pressure side pipe. In addition, the opening degree of the expansion device 16b is controlled so as to keep a degree of superheating at a constant level, the degree of superheating representing a difference between the temperature detected by the third temperature sensor 35a and the temperature detected by the third temperature sensor 35b. In addition, the expansion device 16a is fully opened and the open/close device 17b is closed. Here, the opening degree of the expansion device 16b may be controlled so as to keep a degree of subcooling at a constant level, the degree of subcooling representing a difference between a saturation temperature converted from the pressure detected by the pressure sensor 36 and the temperature detected by the third temperature sensor 35d. Alternatively, the expansion device 16b may be fully opened and the expansion device 16a may be utilized to control the degree of superheating or subcooling.

The flow of the heat medium in the heat medium circuit B will now be described.

In the cooling-main operation mode, the heating energy of the heat source-side refrigerant is transmitted to the heat medium in the intermediate heat exchanger 15b, and the heated heat medium is driven by the pump 21b to flow through the pipe 5. In addition, in the cooling-main operation mode the cooling energy of the heat source-side refrigerant is transmitted to the heat medium in the intermediate heat exchanger 15a, and the cooled heat medium is driven by the pump 21a to flow through the pipe 5.

In the use-side heat exchanger 26d, the heat medium transmits heat to the indoor air thereby heating the indoor space 7. In the use-side heat exchangers 26a to 26c, the heat medium removes heat from the indoor air, thereby cooling the indoor space 7. In this process, the heat medium flows into the use-side heat exchangers 26a to 26d at a flow rate controlled so as to satisfy the air-conditioning load required in the indoor space, by the heat medium flow control devices 25a to 25d, respectively. The heat medium with the temperature slightly lowered by passing through the use-side heat exchanger 26d flows into the intermediate heat exchanger 15b through the heat medium flow control device 25d and the first heat medium flow switching device 22d, and is again sucked into the pump 21b. The heat medium with the temperature slightly increased by passing through the use-side heat exchangers 26a to 26c flows into the intermediate heat exchanger 15a through the heat medium flow control devices 25a to 25c and the first heat medium flow switching devices 22a to 22c, and is again sucked into the pump 21a.

In the mentioned process, the heated heat medium and the cooled heat medium are introduced into the respective use-side heat exchangers 26a to 26d where the heating load and the cooling load are present, without being mixed with each other, under the control of the first heat medium flow switching device 22 and the second heat medium flow switching device 23. In the pipe 5 in the use-side heat exchangers 26a to 26d, the heat medium flows in the direction from the second heat medium flow switching device 23 toward the first heat medium flow switching device 22 through the heat medium flow control device 25, on both of the heating and cooling sides. The air-conditioning load required in the indoor space 7 can be satisfied by controlling so as to maintain at a target value the difference between the temperature detected by the first temperature sensor 31b and the temperature detected by the second temperature sensor 34 on the heating side, and the difference between the temperature detected by the temperature detected by the second temperature sensor 34 and the temperature detected by the first temperature sensor 31a on the cooling side.

During the cooling-main operation mode, the flow path to the use-side heat exchanger 26 where the thermal load has not arisen (including a state where a thermostat is off) is closed by the heat medium flow control device 25 to restrict the flow of the heat medium, since it is not necessary to supply the heat medium to such use-side heat exchanger 26. In FIG. 5, the thermal load is required in all of the use-side heat exchangers 26, and therefore the heat medium flow control device 25 is fully opened.

[Heating Main Operation Mode]

Figure 6:
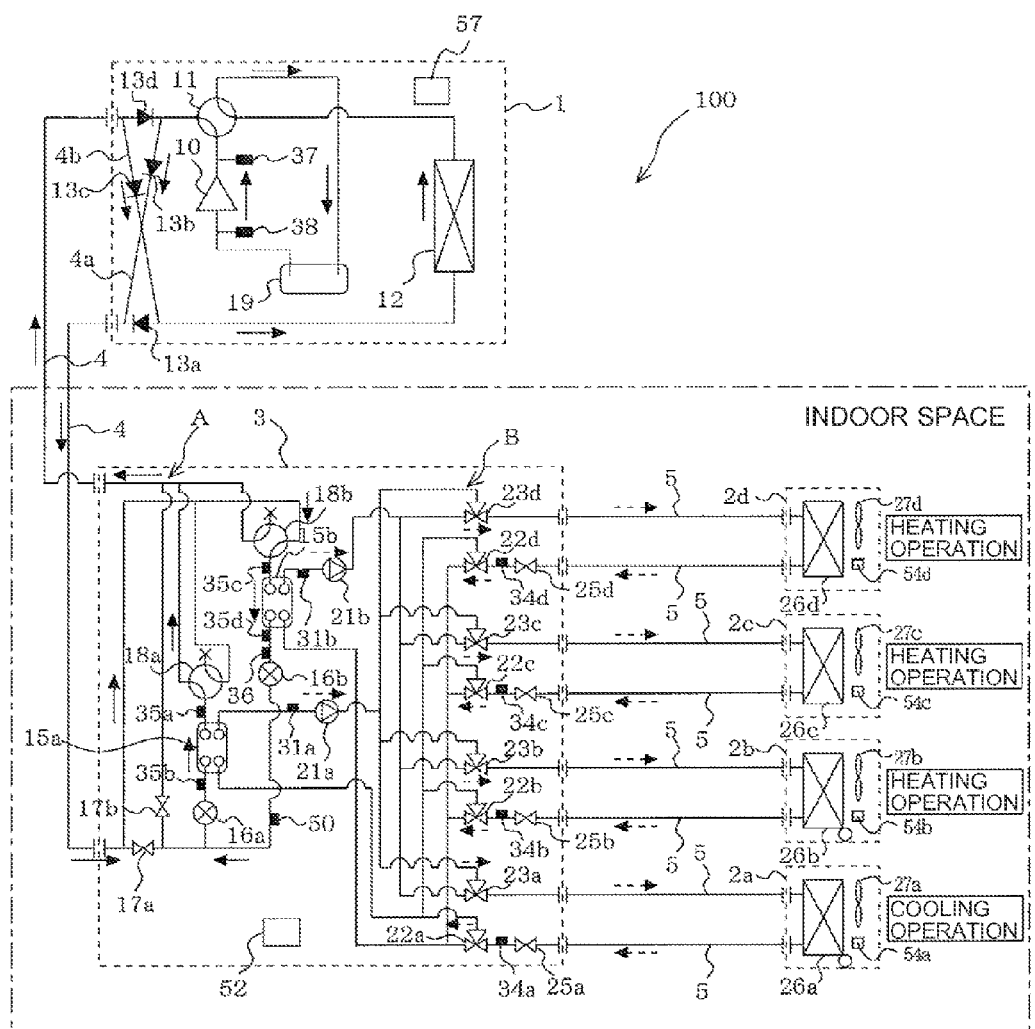
FIG. 6 is a circuit diagram showing the flow of refrigerant in the air-conditioning apparatus shown in FIG. 2, in a heating-main operation.

FIG. 6 is a refrigerant circuit diagram showing the flow of the heat medium in the cooling-main operation mode of the air-conditioning apparatus 100 shown in FIG. 2. Referring to FIG. 6, the heating-main operation mode will be described on the assumption that a heating load has arisen in the use-side heat exchangers 26b to 26d and a cooling load has arisen in the use-side heat exchanger 26a. In FIG. 6, the flow of the heat source-side refrigerant is indicated by solid arrows and the flow of the heat medium is indicated by broken-line arrows.

In the heating-main operation mode shown in FIG. 6, the first refrigerant flow switching device 11 is switched so as to cause the heat source-side refrigerant discharged from the compressor 10 to flow into the heat medium converter 3 without passing through the heat source-side heat exchanger 12, in the outdoor unit 1. In the heat medium converter 3, the pump 21a and the pump 21b are driven with the heat medium flow control devices 25a to 25d fully opened, so that the heat medium circulates between the intermediate heat exchanger 15a and the use-side heat exchanger 26a, as well as between the intermediate heat exchanger 15b and the use-side heat exchangers 26b and 26c.

First, the flow of the heat source-side refrigerant in the refrigerant circuit A will be described.

The heat source-side refrigerant in a low-temperature/low-pressure state is compressed by the compressor 10 and discharged therefrom in the form of high-temperature/high-pressure gas refrigerant. The high-temperature/high-pressure gas refrigerant discharged from the compressor 10 flows out of the outdoor unit 1 through the first refrigerant flow switching device 11 and the check valve 13b. The high-temperature/high-pressure gas refrigerant which has flowed out of the outdoor unit 1 flows into the heat medium converter 3 through the refrigerant pipe 4. The high-temperature/high-pressure gas refrigerant which has entered the heat medium converter 3 flows into the intermediate heat exchanger 15b acting as a condenser, through the second refrigerant flow switching device 18b.

The gas refrigerant which has entered the intermediate heat exchanger 15b transmits heat to the heat medium circulating in the heat medium circuit B, thereby turning into liquid refrigerant. The refrigerant which has flowed out of the intermediate heat exchanger 15b is expanded in the expansion device 16b thereby turning into low-pressure two-phase refrigerant. The low-pressure two-phase refrigerant flows into the intermediate heat exchanger 15a acting as an evaporator through the expansion device 16a. The low-pressure two-phase refrigerant which has entered the intermediate heat exchanger 15a evaporates by removing heat from the heat medium circulating in the heat medium circuit B, thereby cooling the heat medium. The low-pressure two-phase refrigerant then flows out of the intermediate heat exchanger 15a, flows out of the heat medium converter 3 through the second refrigerant flow switching device 18a, and again flows into the outdoor unit 1.

The refrigerant which has entered the outdoor unit 1 flows into the heat source-side heat exchanger 12 acting as an evaporator, through the check valve 13c. The refrigerant which has entered the heat source-side heat exchanger 12 removes heat from outdoor air in the heat source-side heat exchanger 12 thereby turning into low-temperature/low-pressure gas refrigerant. The low-temperature/low-pressure gas refrigerant which has flowed out of the heat source-side heat exchanger 12 is again sucked into the compressor 10, through the first refrigerant flow switching device 11 and the accumulator 19.

In the mentioned process, the second refrigerant flow switching device 18a communicates with the low-pressure pipe, and the second refrigerant flow switching device 18b communicates with the high-pressure side pipe. In addition, the opening degree of the expansion device 16b is controlled so as to keep a degree of subcooling at a constant level, the degree of subcooling representing a difference between a saturation temperature converted from the pressure detected by the pressure sensor 36 and the temperature detected by the third temperature sensor 35b. Here, the expansion device 16a is fully opened and the open/close device 17a is closed. Alternatively, the expansion device 16b may be fully opened and the expansion device 16a may be utilized to control the degree of subcooling.

The flow of the heat medium in the heat medium circuit B will now be described.

In the heating-main operation mode, the heating energy of the heat source-side refrigerant is transmitted to the heat medium in the intermediate heat exchanger 15b, and the heated heat medium is driven by the pump 21b to flow through the pipe 5. In the heating-main operation mode, in addition, the cooling energy of the heat source-side refrigerant is transmitted to the heat medium in the intermediate heat exchanger 15a, and the cooled heat medium is driven by the pump 21a to flow through the pipe 5. The heat medium pressurized in the pump 21a and the pump 21b and discharged therefrom flows into the use-side heat exchangers 26a to 26d, through the second heat medium flow switching device 23a and the second heat medium flow switching device 23b, respectively.

In the use-side heat exchanger 26a, the heat medium removes heat from the indoor air, thereby cooling the indoor space 7. In the use-side heat exchangers 26b to 26d, the heat medium transmits heat to the indoor air thereby heating the indoor space 7. In this process, the heat medium flows into the use-side heat exchanger 26a to 26d at a flow rate controlled so as to satisfy the air-conditioning load required in the indoor space, by the heat medium flow control device 25a and the heat medium flow control device 25b, respectively. The heat medium with the temperature slightly increased by passing through the use-side heat exchanger 26a flows into the intermediate heat exchanger 15a through the heat medium flow control device 25a and the first heat medium flow switching device 22a, and is again sucked into the pump 21a. The heat medium with the temperature slightly lowered by passing through the use-side heat exchangers 26b to 26d flows into the intermediate heat exchanger 15b through the heat medium flow control devices 25b to 25d and the first heat medium flow switching devices 22b to 22d, and is again sucked into the pump 21b.

In the mentioned process, the heated heat medium and the cooled heat medium are introduced into the use-side heat exchanger 26a or 26b to 26d where the cooling load and the heating load are present, without being mixed with each other, under the control of the first heat medium flow switching device 22 and the second heat medium flow switching device 23. In the pipe 5 in the use-side heat exchangers 26a and 26b to 26d, the heat medium flows in the direction from the second heat medium flow switching device 23 toward the first heat medium flow switching device 22 through the heat medium flow control device 25, on both of the heating and cooling sides. The air-conditioning load required in the indoor space 7 can be satisfied by controlling so as to maintain at a target value the difference between the temperature detected by the first temperature sensor 31b and the temperature detected by the second temperature sensor 34 on the heating side, and the difference between the temperature detected by the second temperature sensor 34 and the temperature detected by the first temperature sensor 31a on the cooling side.

During the heating-main operation mode, the flow path to the use-side heat exchanger 26 where the thermal load has not arisen (including a state where a thermostat is off) is closed by the heat medium flow control device 25 to restrict the flow of the heat medium, since it is not necessary to supply the heat medium to such use-side heat exchanger 26. In FIG. 7, the heat medium is supplied to all of the use-side heat exchangers 26a to 26d because the thermal load is required in those use-side heat exchangers, however when the thermal load is not required in any of the use-side heat exchangers, the corresponding heat medium flow control device 25 is closed.

Referring now to FIG. 7, the data communication method of the air-conditioning apparatus 100 according to Embodiment will be described hereunder. In the air-conditioning apparatus 100 according to Embodiment, the outdoor unit controller 57, the heat medium converter controller 52, and the indoor unit controller 54 communicate with each other as follows, so as to suppress an increase in communication traffic.

When an instruction about the operation is inputted to the remote controller 53, the instruction is transmitted from the remote controller 53 to the heat medium converter controller 52 of the heat medium converter 3 and the indoor unit controller 54 of the corresponding indoor unit 2. In addition, the instruction is transmitted from the heat medium converter controller 52 of the heat medium converter 3 to the outdoor unit controller 57 of the outdoor unit 1. Parallel to the above, the target temperature set by the target temperature setting unit 40 and the temperature detected by the temperature sensor 39 (temperature in the space to be air-conditioned) are transmitted from the remote controller 53 to the heat medium converter controller 52 of the heat medium converter 3. Here, from the remote controller 53 to the indoor unit controller 54 of the corresponding indoor unit 2, only the data of the rotation speed (for example, high, medium, and low) of the indoor air-sending device 27 is transmitted, and the target temperature set by the target temperature setting unit 40 and the temperature detected by the temperature sensor 39 are not. Since the air-conditioning apparatus 100 according to Embodiment is configured to allow each of the indoor units 2 to perform the cooling or heating operation, data of the operation mode is also transmitted from the remote controller 53 to the heat medium converter controller 52. The data of the operation mode is also transmitted to the outdoor unit controller 57 through the heat medium converter controller 52.

Through the mentioned process, the operation of the air-conditioning apparatus 100 is started.

To be more detailed, the heat medium converter controller 52 opens and closes the open/close devices 17a, 17b, switches the flow path in the second refrigerant flow switching device 18, switches the flow path in the first heat medium flow switching device 22, and switches the flow path in the second heat medium flow switching device 23, on the basis of the operation mode. The heat medium converter controller 52 also sets the opening degree of the expansion device 16, the rotation speed of the pump 21, and the opening degree of the heat medium flow control device 25 to predetermined values on the basis of the temperature set by the target temperature setting unit 40 and the temperature detected by the temperature sensor 39. Then the heat medium converter controller 52 controls the opening degree of the expansion device 16, the rotation speed of the pump 21, and the opening degree of the heat medium flow control device 25 according to the mentioned settings.

The outdoor unit controller 57 switches the flow path in the first refrigerant flow switching device 11 on the basis of the operation mode. The outdoor unit controller 57 also sets the rotation speed of the compressor 10 and the rotation speed of the outdoor air-sending device to predetermined values, on the basis of the temperature set by the target temperature setting unit 40 and the temperature detected by the temperature sensor 39. Then the outdoor unit controller 57 controls the rotation speed of the compressor 10 and the rotation speed of the outdoor air-sending device according to the mentioned settings.

The indoor unit controllers 54 each control the rotation speed of the indoor air-sending device 27 according to the data of the rotation speed of the indoor air-sending device 27.

Here, the difference between the temperature set by the target temperature setting unit 40 and the temperature detected by the temperature sensor 39 may be transmitted from the remote controller 53 to the heat medium converter controller 52, instead of such data as it is.

Although the indoor unit 2 possesses its own address and the connection/branch address of the heat medium converter 3, and the remote controller 53 possesses the connection address of the corresponding indoor unit, the air-conditioning apparatus 100 recognizes the settings of the outdoor unit 1, the heat medium converter 3, the indoor unit 2, and the remote controller 53 when the power is turned on, and therefore it is not necessary to confirm the relations each time a normal operation is performed.

As described above, the configuration according to Embodiment, in which the remote controller 53 includes the temperature sensor 39, and the outdoor unit controller 57, the heat medium converter controller 52, and the indoor unit controller 54 communicate with each other, allows the data (target temperature and so forth) to be directly transmitted from the remote controller 53 to the heat medium converter controller 52, unlike in the conventional system in which the data is once transmitted from the remote controller to the indoor unit and then again transmitted from the indoor unit to the heat medium converter. Therefore, the configuration of the air-conditioning apparatus 100 according to Embodiment suppresses the increase in communication traffic, despite the number of indoor units 2 being increased. In addition, the sucked air temperature sensor included in the conventional indoor unit is eliminated, and therefore the cost of the controller can be reduced.

Although the heat source unit is composed of the outdoor unit 1 and the heat medium converter 3 which are separate units in Embodiment, the outdoor unit 1 and the heat medium converter 3 may be unified to constitute the heat source unit. In this case, the outdoor unit controller 57 and the heat medium converter controller 52 may also be unified so as to constitute a heat source unit controller.

Further, the air-conditioning apparatus 100 according to Embodiment includes the refrigerant circuit A and the heat medium circuit B, the present invention is also applicable to an air-conditioning apparatus configured to supply refrigerant heated or cooled in the heat source unit (outdoor unit) directly to the indoor unit, in which case the aforementioned advantageous effects can equally be attained.

REFERENCE SIGNS LIST

1: outdoor unit, 2 (2a to 2d): indoor unit, 3: heat medium converter, 4: refrigerant pipe, 4a: first connection pipe, 4b: second connection pipe, 5: pipe, 6: outdoor space, 7: indoor space, 8: space, 9: building, 10: compressor, 11: first refrigerant flow switching device, 12: heat source-side heat exchanger, 13a to 13d: check valve, 15 (15a, 15b): intermediate heat exchanger, 16 (16a, 16b): expansion device, 17a, 17b: open/close device, 18 (18a, 18b): second refrigerant flow switching device, 19: accumulator, 21 (21a, 21b): pumps, 22 (22a to 22d): first heat medium flow switching device, 23 (23a to 23d): second heat medium flow switching device, 25 (25a to 25d): heat medium flow control device, 26 (26a to 26d): use-side heat exchanger, 27 (27a to 27d): indoor air-sending device, 31 (31a, 31b): first temperature sensor, 34 (34a to 34d): second temperature sensor, 35 (35a to 35d): third temperature sensor, 36: first pressure sensor, 37: second pressure sensor, 38: third pressure sensor, 39 (39a to 39d): temperature sensor, 40 (40a to 40d): target temperature setting unit, 50: fourth temperature sensor, 52: heat medium converter controller, 53 (53a to 53d): remote controller, 54: indoor unit controller, 57: outdoor unit controller, 100: air-conditioning apparatus, A: refrigerant circuit, B: heat medium circuit

The invention claimed is:

1. An air-conditioning apparatus comprising:
   a heat source unit that exchanges heat between outdoor air and a heat source-side heat exchanger thereby generating cooling energy or heating energy;
   a plurality of indoor units each connected to the heat source unit, and configured to exchange heat between air in a space to be air-conditioned supplied by an indoor air-sending device and a use-side heat exchanger and transmit the cooling energy or heating energy supplied from the heat source unit to the space to be air-conditioned thereby conditioning air in the space to be air-conditioned;
   a plurality of remote controllers respectively provided for the plurality of indoor units to input an instruction to start and stop an operation of the corresponding indoor unit, an operation mode, and a target temperature of the space to be air-conditioned by the corresponding indoor unit;
   a heat source unit controller provided in the heat source unit and configured to control devices constituting the heat source unit; and
   a plurality of indoor unit controllers respectively provided in the indoor units and configured to control devices constituting the indoor unit,
   wherein the remote controllers each include a temperature sensor that detect a temperature of the corresponding space to be air-conditioned, and are each configured to communicate with the heat source unit controller and the indoor unit controller of the corresponding indoor unit,
   transmit the instruction to start and stop the operation and data related to rotation speed of the indoor air-sending device to the corresponding indoor unit controller, and
   transmit the instruction to start and stop the operation, and the target temperature and the temperature detected by the temperature sensor or a difference therebetween, to the heat source unit controller.

2. The air-conditioning apparatus of claim 1, further comprising:
   a refrigerant circuit in which heat source-side refrigerant circulates, the refrigerant circuit including a compressor, the heat source-side heat exchanger, a plurality of expansion devices, a refrigerant-side flow path in each of a plurality of intermediate heat exchangers, and a plurality of refrigerant flow switching devices that switch a circulation path connected via a refrigerant pipe; and
   a heat medium circuit in which a heat medium circulates, the heat medium circuit including a pump, a plurality of the use-side heat exchangers, a heat medium flow switching device, and a heat medium-side flow path in each of the intermediate heat exchanger connected via a heat medium pipe,
   wherein the compressor, the heat source-side heat exchanger, the plurality of expansion devices, the plurality of intermediate heat exchangers, the plurality of refrigerant flow switching devices, the pump, and the heat medium flow switching device are provided in the heat source unit, the use-side heat exchangers are respectively provided in the indoor units, and the cooling energy or the heating energy generated in the heat source-side heat exchanger is transported by the heat source-side refrigerant to the intermediate heat exchanger and transmitted to the heat medium, and transported by the heat medium to the use-side heat exchangers.

3. The air-conditioning apparatus of claim 2, wherein the heat source unit includes an outdoor unit and a heat medium converter, the outdoor unit includes the compressor, the heat source-side heat exchanger, and a first refrigerant flow switching device that switches a flow path of the heat source-side refrigerant discharged from the compressor, the first refrigerant flow switching device being one of the plurality of refrigerant flow switching devices, the heat medium converter includes the plurality of expansion devices, the plurality of intermediate heat exchangers, one or more refrigerant flow switching devices in the plurality of refrigerant flow switching devices other than the first flow switching device, the pumps, and the heat medium flow switching device, the heat source unit controller is divided into an outdoor unit controller provided in the outdoor unit and a heat medium converter controller provided in the heat medium converter, and the remote controllers each transmit the instruction to start and stop the operation, and the target temperature and the temperature detected by the temperature sensor or a difference therebetween, to the heat medium converter controller.

4. The air-conditioning apparatus of claim 1, wherein the remote controllers are separate from corresponding indoor units.

\* \* \* \* \*